United States Patent [19]

Nagayama

[11] 4,338,612

[45] Jul. 6, 1982

[54] MULTIPLE DEFLECTION PLATE DEVICE FOR LIQUID JET PRINTER OR THE LIKE

[75] Inventor: Haruhiko Nagayama, Machida, Japan

[73] Assignee: Ricoh Co., Ltd., Tokyo, Japan

[21] Appl. No.: 191,524

[22] Filed: Sep. 29, 1980

[30] Foreign Application Priority Data

| | | | |
|---|---|---|---|
| Oct. 11, 1979 | [JP] | Japan | 54-129917 |
| Nov. 10, 1979 | [JP] | Japan | 54-145855 |
| Apr. 28, 1980 | [JP] | Japan | 55-55495 |

[51] Int. Cl.[3] .......... G01D 15/18

[52] U.S. Cl. .......... 346/75; 346/140 R

[58] Field of Search .......... 346/75, 140

[56] References Cited

U.S. PATENT DOCUMENTS 3,786,517 1/1974 Krause .......... 346/75

OTHER PUBLICATIONS

Haskell et al., Deflecting Plate Assembly for Multiple Ink Jet Printer, IBM TDB, vol. 12, No. 11, 4/70, p. 2001.

*Primary Examiner*—Joseph W. Hartary

*Attorney, Agent, or Firm*—Burgess, Ryan and Wayne

[57] ABSTRACT

A multiple deflection plate device for a liquid jet printer or the like in which a plurality of deflection plate units each consisting of a substrate of an insulating material and having a thin-film pattern of a deflection plate and its connecting line formed on one or both surfaces of the substrate, have their sides inserted into a plurality of slits, respectively, formed through an insulating deflection plate unit holder in parallel and equally-spaced apart relationship, whereby the deflection plate units can be arrayed with a higher degree of pitch accuracy and a higher degree of parallelism.

7 Claims, 17 Drawing Figures

MULTIPLE DEFLECTION PLATE DEVICE FOR LIQUID JET PRINTER OR THE LIKE

BACKGROUND OF THE INVENTION

The present invention relates to a multiple liquid jet printer or the like and more particularly to a multiple deflection plate device for a liquid jet printer of the type in which multiple liquid jets issue from a liquid drop generator; drops can be selected individually for printing or deletion and charged or uncharged by individually addressable charge electrodes and the charged drops are deflected by individual deflection plate pairs.

The liquid jet printer or the like of the type described must be provided with an array of nozzles, an array of charge electrodes and an array of deflection plate pairs. Since the deflection plate pair array is very complex in construction and because the fabrication of individual deflection plate pairs and subsequent assembly are extremely difficult, the deflection plate pairs can not be arrayed with a desired degree of pitch accuracy and a desired degree of parallelism. As a result, high quality images cannot be reproduced. In addition, the prior art deflection plate pair mounting methods and means are such that a desired degree of pitch accuracy and a desired degree of parallelism cannot be maintained.

SUMMARY OF THE INVENTION

In view of the above, the primary object of the present invention is to provide a multiple deflection plate pair device for a liquid jet printer or the like which can substantially eliminate the above and other problems encountered in the prior art devices.

In general, a multiple deflection plate pair device in accordance with the present invention comprises a plurality of deflection plate units and one or more deflection plate unit holders. Each deflection plate unit comprises a substrate of an insulating material with a thin-film pattern of a deflection plate and its connecting line formed on one or both surfaces of the substrate. The holder is made of an insulating material and formed with a plurality of parallel and equally-spaced mounting slits. One side of the deflection plate unit remote from the side along which are formed the deflection plates inserted into the slit of the holder. Therefore the deflection plate units can be arrayed with a higher degree of pitch accuracy and a higher degree of parallelism.

According to one embodiment of the present invention, a plurality of deflection plate units are mounted on a single or two holders. Alternatively, their vertical sides are clamped between a pair of comb-shaped holders having a plurality of vertical, parallel and equally-spaced grooves formed in the opposing faces.

According to another embodiment of the present invention, the cross section of the slits of the holders are slightly greater than that of the portion of each deflection plate unit inserted into the slit. After the deflection plate units are inserted into the slits of the holders and the pitch and the parallelism have been correctly adjusted, a suitable filler is filled into the space between the deflection plate unit and the slit, whereby the deflection plate units can be arrayed and maintained with a higher degree of pitch accuracy and a higher degree of parallelism.

According to a further embodiment of the present invention, one or more dummy lands are formed simultaneously with the formation of thin-film patterns on the surfaces of the deflection plate unit. The dummy land is spaced apart from the connecting line by a predetermined distance and so located that it extends through the slit when the deflection plate unit is inserted into this slit, whereby the deflection plate unit can be snugly fitted in this slit and no backlash can be left between the deflection plate unit and the slit.

According to the present invention, the deflection plate units and hence the deflection plate pairs can be arrayed with a higher degree of pitch accuracy and parallelism as described above in a very simple manner. Therefore, the deflection by every deflection plate pair can be maintained constant so that a deflection control circuit can be much simplified and fabricated at less costs.

CONCRETE DESCRIPTION OF A PRIOR ART

Figure 1A:
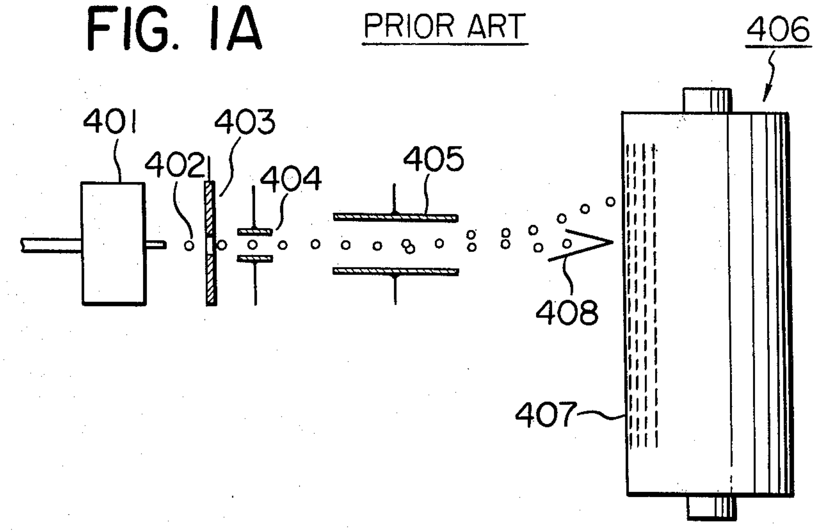
FIG. 1A PRIOR ART
FIGS. 1A and 1B are views used for the explanation of the underlying principle of an ink jet printer.
Figure 1B:
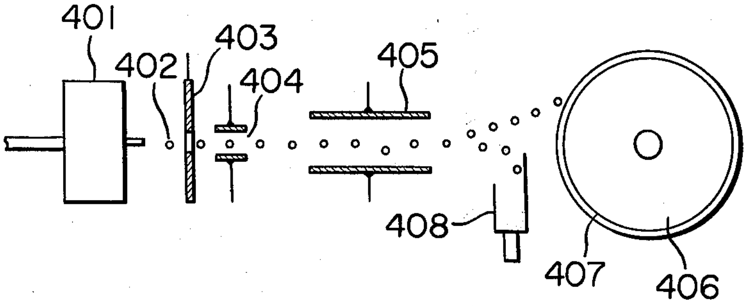
FIG. 1B PRIOR ART

FIGS. 1A and 1B show the underlying principle of the liquid or ink jet printer. Numeral 401 is an ink drop generator for generating a stream of ink drops 402; 403, a charge electrode for charging the ink drops 402; 404, a sensor plate for synchronizing the timing of an ink drop issuing from the ink drop generator 401 with the timing of charging an ink drop; 405, a pair of deflection plates; 406, a drum around which is wrapped a recording medium 407; and 408, a gutter for collecting unused ink drops for recirculation.

Figure 1C:
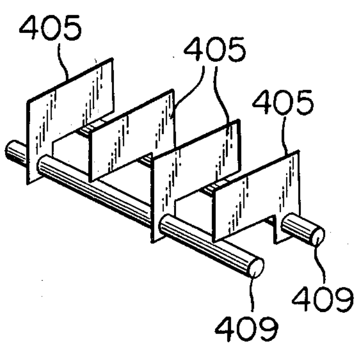
FIG. 1C PRIOR ART
FIG. 1C is a perspective view of a prior art multiple deflection plate pair device.

The deflection plates 405, which are made of a thin metal sheet, are alternately mounted on two metal supporting rods 409 as shown in FIG. 1C. However, since the deflection plates are supported only at one point by the supporting rod 409 and because, as just described above, they are alternately mounted on the supporting rods 409, it is extremely difficult to assemble them in such a way that they are exactly in parallel with each other and correctly spaced apart from each other by a predetermined distance. As a result, after the deflection plate assembly or unit has been completed, the parallelism and spacing between the deflection plates 405 must be adjusted again. Moreover, this deflection plate unit has a defect that since the positive and negative deflection plates 405 are alternately disposed, equally charged ink drops in the adjacent streams are deflected in the opposite directions so that a deflection control circuit (not shown) is very complex in construction and therefore very expensive.

DESCRIPTION OF THE PREFERRED EMBODIMENTS

Figure 2:
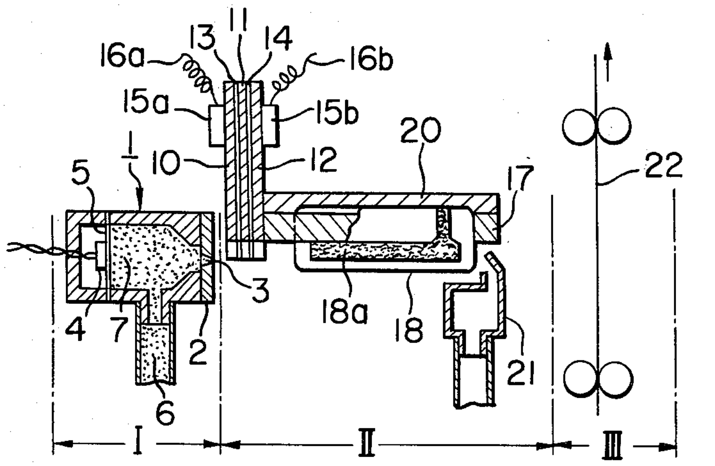
FIG. 2 is a longitudinal sectional view of a liquid jet printer incorporating a multiple deflection plate pair device in accordance with the present invention.

In FIG. 2 is shown in longitudinal section a liquid jet printer incorporating a multiple deflection plate unit in accordance with the present invention. The printer comprises in general a liquid or ink drop generator I, a charge deflection unit II and a recording medium transport unit III. The drop generator I is mounted on a stationary member (not shown) and the charge deflection unit II is so disposed that it can be retracted upwardly away from the passages of a plurality of streams of ink drops before or after printing so that the deflection plates can be avoided from being contaminated by the liquid or ink drops which become sluggish when the printing is started or stopped. The transport unit III includes feed roller pairs for transporting the recording medium upward as indicated by an arrow.

The liquid drop generator I comprises a liquid manifold 1, an orifice or nozzle plate 2 with a plurality or orifices or nozzles 3; a piezoelectric driver; 4, a diaphragm; 5, a liquid or ink supply tube; and 6, liquid 7 in the liquid manifold. As is well known in the art, when the pressure in the liquid manifold 1 rises to a few kilograms per square centimeter (kg/cm$^2$), a plurality of parallel streams of liquid drops issue from the orifices or nozzles 3.

The charge deflection unit II comprises a charge electrode unit 10, a charge sensor plate unit 11, an insulating plate 12, shield plates 13 and 14, a charge voltage connector **15*a* connected through a multi-core cable 16*a* to a charge voltage control circuit (not shown), a charge detection output connector 15*b* connected through a multi-core cable 16*b* to a charge sensor circuit (not shown), a deflection plate unit holder 17, deflection plate units 18, an electrode protector 20 and a gutter 21**.

The charge sensor plate unit 11 is electrostatically shielded from the charge voltages and deflection voltages by the shield plates 13 and 14. The upper surface of the deflection plate unit holder 17 is covered with the electrode protector 20, so that contacts to the deflection plate patterns **18*a* on the deflection plate units 18 can be prevented. In response to the print signals, the ink drops issued from the orifices of the ink drop generator I are selectively charged by the charge electrodes and are deflected by the deflection plate pairs through an angle which is dependent upon the charge on each ink drop. The deflected ink drops land at predetermined positions on the recording medium 22, whereby the dot image can be reproduced. The uncharged ink drops are steered straight and trapped by the gutter 21** for recirculation.

Figure 3:
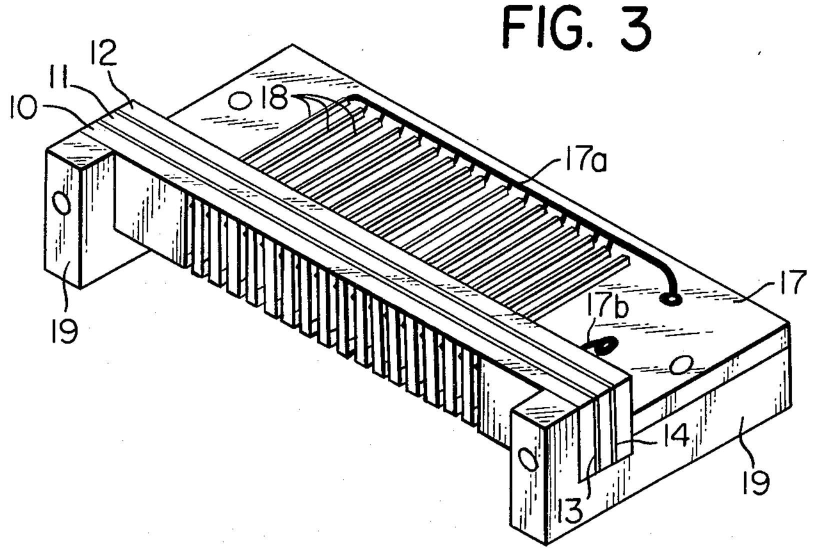
FIG. 3 is a perspective view of a charge deflection unit or section II thereof.

FIG. 3 is a perspective view of the charge deflection unit II with the electrode protector 20 removed. The charge electrode unit 10, the charge sensor plate unit 11 and the deflection plate unit holder 17 are mounted on holders 19 as a unitary construction.

In the case of multiple ink jet printing, an array of nozzles, an array of charge electrodes and an array of deflection plate pairs are needed as described previously. The charge electrodes and the deflection plate pairs must be so assembled that they are correctly spaced apart from each other by a predetermined distance. However, because of their complex construction and difficulties encountered in fabrication and assembly, it has been extremely difficult to obtain high accuracy as to the pitch between the deflection plate pairs.

The present invention was made to overcome the above and other problems encountered in the prior art multiple liquid or ink jet printers.

Figure 4:
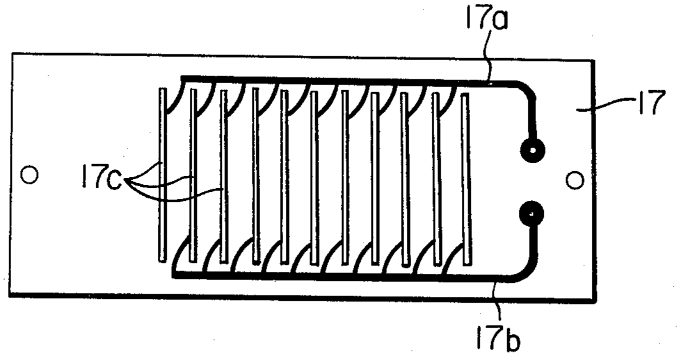
FIG. 4 is a top view of a deflection plate unit holder of a first embodiment of the present invention.
Figure 5:
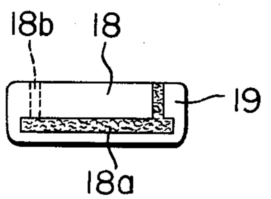
FIG. 5 is a top view of a deflection plate unit of the first embodiment.
Figure 6:
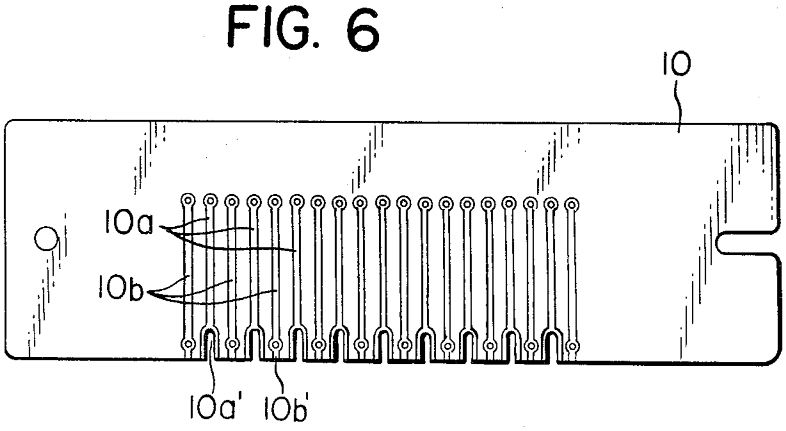
FIG. 6 is a front view of a charge electrode unit of the charge deflection unit or section II shown in FIG. 3.

FIRST EMBODIMENT, FIGS. 4, 5 and 6

Referring to FIGS. 4 and 5, the deflection plate unit holder 17 is made of a chemically etchable, photosensitive glass such as a photosensitive opal glass containing lithium. When a substrate of a photosensitive opal glass is exposed to the ultraviolet rays through a mask, the crystals of $Li_2O$ $SiO_2$ are precipitated at the exposed areas. When the substrate is immersed in a dilute solution of hydrofluoric acid (2–10%) so that these crystals are dissolved. Thus only the exposed areas of the substrate are removed. The holder 17 is formed with a plurality of parallel slots **17*c* by this lithographic process. Thereafter, connecting line patterns 17*a* and 17*b*** are formed.

Because of the above-described lithographic process, the holder 17 can be fabricated in a simple manner and the slots **17*c*** can be spaced apart from each other with a higher degree of accuracy. In addition, a higher degree of interchangeability can be ensured.

The deflection plate unit 18 is shown in FIG. 5. The substrate of the deflection plate unit 18 is made of an insulating material such as glass or ceramic. Deflection plate patterns **18*a* and 18*b* are formed on both the surfaces of the substrate. When the deflection plate units 18 are inserted into the slots 17*c* of the holder 17, the thin-film deflection plate patterns 18*a* and 18*b* are made into electrical contact with the corresponding connecting line patterns 17*a* and 17*b* and the deflection plate units 18** are spaced apart from each other by a predetermined pitch with a higher degree of accuracy. Thus the multiple deflection plate device with a higher degree of pitch accuracy is provided.

The charge electrode unit 10 or charge sensor plate unit 11 is best shown in FIG. 6. Since both units 10 and 11 are completely similar in construction, it will suffice to describe only the charge electrode unit 10. The substrate of the unit 10 is made of an insulating material such as glass or more preferably a chemically etchable, light-sensitive glass as with the case of the holder 17. Thin-film charge voltage feed lines **10*a* and thin-film shield lines 10*b* are alternately patterned in parallel with each other on one surface of the substrate. One end of each voltage feed line 10*a* on one side of the substrate is provided with a relatively deep notch 10*a*′ through which passes a stream of ink drops. The entire inner surface of each notch is plated. Each shield line 10*b* is formed with a hole 10*b*′ in opposed relationship with the notch 10$a'$. The inner surfaces of the holes 10$b'$ are also plated completely. Therefore, the charge electrodes, which are defined by the plated notches 10$a'$, are effectively shielded by the shield electrodes which are defined by the plated holes 10**$b'$. As a result, the stream of ink drops passing through one notch or charge electrode can be prevented from being adversely affected by the voltages applied to the adjacent charge electrodes.

In summary, according to the first embodiment of the present invention, there can be provided a multiple deflection plate device for a liquid jet printer which is simple in construction and easy to fabricate and assemble and has a higher degree of deflection plate pitch accuracy.

Figure 7A:
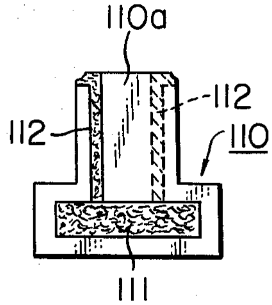
FIG. 7A is a side view of a deflection plate unit of a second embodiment of the present invention.
Figure 7B:
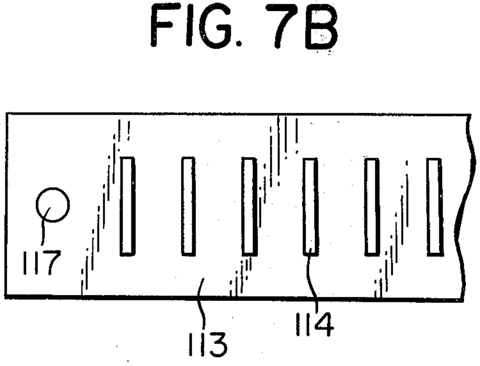
FIG. 7B is a fragmentary top view of a deflection plate unit holder of the second embodiment.
Figure 7C:
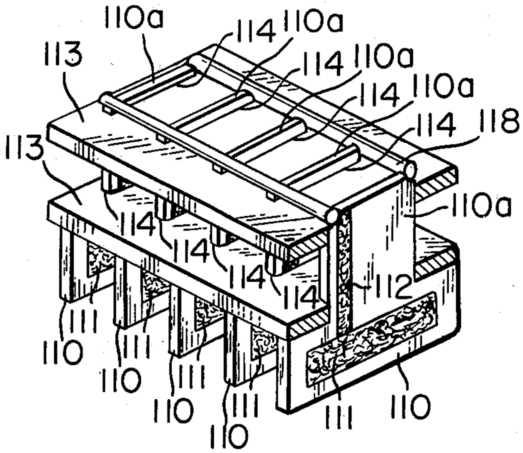
FIG. 7C shows the assembly of the deflection plate units shown in FIG. 7A and the holder shown in FIG. 7B.

SECOND EMBODIMENT, FIGS. 7A to 7C

Referring to FIGS. 7A, 7B and 7C, the second embodiment of the present invention comprises in general a plurality of deflection plate units 110 and two holders 113 made of an insulating material. As best shown in FIG. 7A a thin-film deflection plate 111 and its connecting line 112 are patterned on each surface of the substrate of the unit 110 by the screen printing, plating or vacuum evaporation process. More specifically, the thin-film deflection plate 111 is extended lengthwise on the flange portion of the inverted-T-shaped substrate while the connecting line 112 is extended on the web portion 110*a* thereof.

As best shown in FIG. 7B, the holder 113 is formed with a plurality of parallel slits 114 into which are inserted the web portions 110*a* of the deflection plate units 110. The holders 113 are also provided with mounting holes 117 through which are extended connecting means 116 such as through bolts for mounting the holders 113 in parallel on a supporting member 115 (See FIG. 9).

The deflection plate units 110 and the holders 113 are assembled as shown in FIG. 7C. The two holders 113 are supported in parallel by the supporting member 115 and vertically spaced apart from each other by a predetermined distance. The web or leg portion 110*a* of each deflection plate unit 110 is inserted into the slits 114 of the lower and upper holders 113. Thus the deflection plate units 110 are automatically held in parallel with each other. Thereafter, the web or leg portions 110*a* of the units 110 are bonded to the holders 113 with a suitable adhesive. Next the upper ends of the connecting lines 112 of the deflection plate units 110 extended out of the upper holder 113 are joined by soldering or the like to two parallel conductor wires 118.

THIRD EMBODIMENT, FIG. 8

Figure 8:
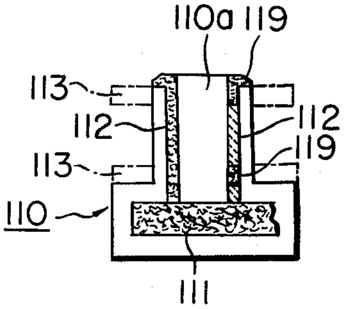
FIG. 8 is a side view of a deflection plate unit of a third embodiment of the present invention.

In FIG. 8, parts similar to or corresponding to those shown in FIGS. 7A to 7C are designated by the same reference numerals. The third embodiment is substantially similar in construction to the second embodiment described above except that dummy lands 119 are printed, plated or evaporated on the web or leg portions 110*a* of the deflection plate units 110 simultaneously when the deflection plates 111 and their connecting lines 112 are formed. These dummy lands 119 are in parallel with the connecting line 112 and spaced apart therefrom by a predetermined distance and located at such positions that when the deflection plate unit 110 is inserted into the slits 114 of the upper and lower holders 113 as shown in FIG. 7C, the upper and lower dummy lands 119 are extended through the slits 114 and made into contact with the wall surfaces of the slits.

Since the connecting line 112 and the dummy lands 119 have the same thickness, when the web or leg portion 110*a* of the deflection plate unit 110 is inserted into the slits 114 of the upper and lower holders 113, no backlash is left between the web or leg portion 110*a* and the slits 114. As a result, the deflection plate units 110 can be securely held in position with a higher degree of parallelism.

The deflection plate 111 and its connecting line 112 may be formed on only one surface. One or more holders 113 may be used. A conduction or circuit pattern may be formed on the surface of the holder, and therefore, printed circuit boards may be used as holders 113.

Figure 9:
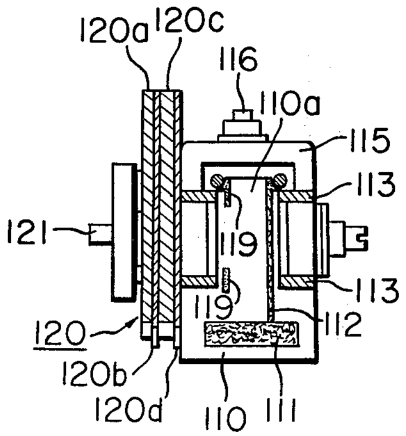
FIG. 9 is a sectional view of a charge deflection unit or section II incorporating the deflection plate units of the type shown in FIG. 8.

The holders 113 with the parallel deflection plate units 110 and an electrode assembly consisting of a charge electrode unit 120*a*, a shield plate 120*b*, a charge sensor plate unit 120*c* and a shield plate 120*d* stacked in the order named are assembled and securely held with suitable connection means 121 such as through bolts as a unitary construction (See FIG. 9). Thus, assembled charge deflection unit II is mounted on a vertically movable supporting means (not shown), so that the unit II is brought to the operative position only when the streams of ink drops are issuing in a stabilized manner and is retracted to the inoperative position when the printing is started or stopped, whereby the charge deflection unit II can be prevented from being contaminated by the sluggish streams of ink drops as described elsewhere.

FOURTH EMBODIMENT, FIG. 10

Figure 10:
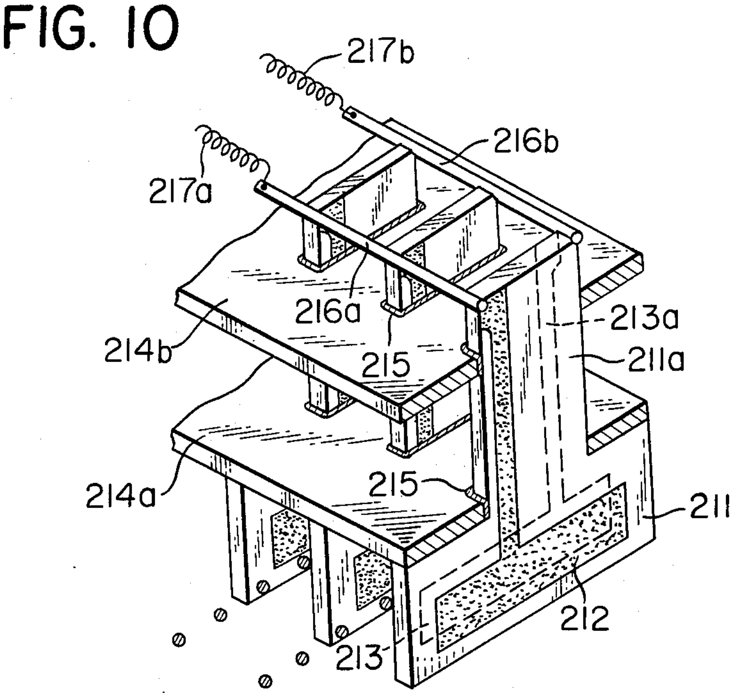
FIG. 10 is a fragmentary perspective view of a fourth embodiment of the present invention.

Referring to FIG. 10, numeral 211 is a deflection plate unit in the form of an inverted T made of a ceramic. Thin-film deflection electrodes 212 and 213 are formed over the surfaces, respectively, of the flange or base portion of the substrate while their connecting lines 212*a* and 213*a* are patterned over the surfaces, respectively, of the web portion 211*a*. A lower holder 214*a* and an upper holder 214*b* are made of glass and each formed with a plurality of parallel and equally-spaced slits slightly greater in dimension than the web portions 211*a* of the deflection plate units 211. After the web portion 211*a* has been inserted into the slits of the lower and upper holders 214*a* and 214*b*, a filler 215 is filled into the space between the slit and the web portion 211*a* so that the deflection plate unit 211 can be securely held in position by the lower and upper holders 214*a* and 214*b*.

The upper ends of the connecting lines 212*a* of the deflection plate units 211 are connected to a lead-in wire 216*a* which in turn is connected with a wire lead 217*a* to the high-voltage terminal of a deflection voltage source (not shown). In like manner, the upper ends of the connecting lines 213*a* are connected to another lead-in wire 216*b* which in turn is connected with a wire lead 217*b* to the grounding terminal of the constant deflection voltage source.

The deflection electrodes 212 and 213 may be formed by screen printing their patterns of an electrically conductive paste consisting of Ag or Ag-Pd and baking the patterns. The slits of the holders 214*a* and 214*b* may be formed in the manner substantially similar to that described elsewhere. As described previously, the cross section of the slit is slightly greater than that of the web portion 211*a* so that there exists some clearance between them.

In assembly, a plurality of the deflection plate units 211 are arrayed in parallel and at a predetermined pitch by using a jig (not shown). Thereafter, the web portions 211*a* are inserted into the slits of the holders 214*a* and 214*b* and the space between the slit and the web portion 211*a* is filled with a glass or resin having a relatively low melting point and then heated so that the melted filler glass or resin completely fills the space. Alternatively, the space may be filled at room temperature.

According to the fourth embodiment, the deflection plate units 211, which are arrayed by the jig with a higher degree of pitch accuracy, can be inserted into the slits of the holders 214*a* and 214*b* and securely held in position, so that they can be assembled with a higher degree of dimensional accuracy. In addition, since the holders 214*a* and 214*b* are made of an inorganic material, they are stable against the changes in environmental conditions, so that they can hold the dimensional accuracy of the deflection plate units 211 in a stabilized manner.

Instead of the glass holders, ceramic holders may be used. In addition, instead of two holders, only one holder may be used when it can be increased in thickness.

FIFTH EMBODIMENT, FIG. 11

Figure 11:
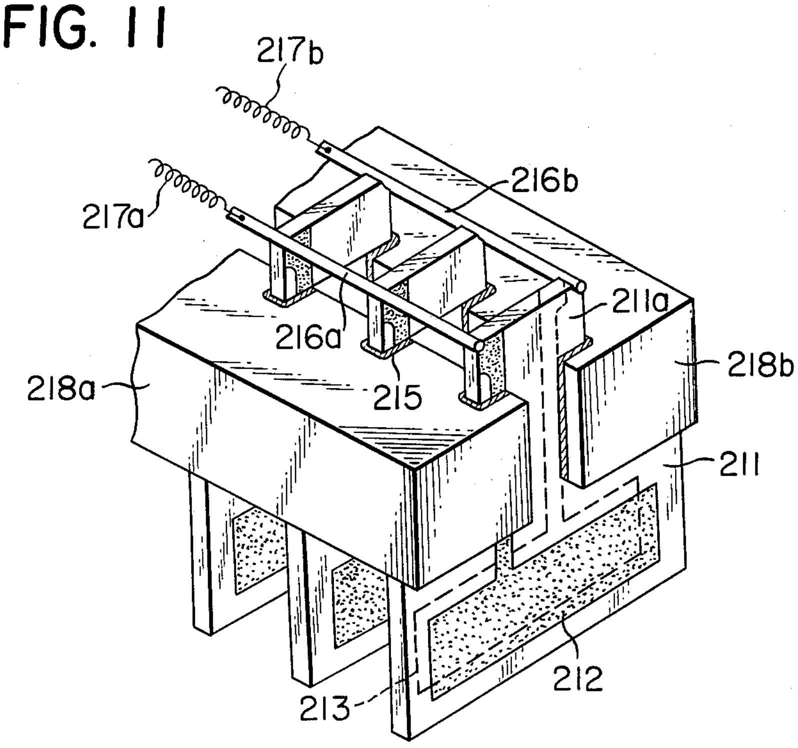
FIG. 11 is a fragmentary perspective view of a fifth embodiment of the present invention.

In FIG. 11, parts similar to those shown in FIG. 10 are designated by the same reference numerals. The fifth embodiment of the present invention is substantially similar in construction to the fourth embodiment except the construction of the holders 218*a* and 218*b* made of an inorganic material. One side face of the holder 218*a* or 218*b* is formed with a plurality of parallel and equally-spaced grooves slightly greater in dimension than the web portion 211*a* of the deflection plate unit 211. The two holders 218*a* and 218*b* are disposed in such a way that their side faces with the grooves are in opposed relationship as shown and are spaced apart from each other by a predetermined distance. Thereafter, the web portions 211*a* of the deflection plate units 211 are inserted into the grooves. Next a filler 215 is filled into the space between the web portion 211*a* and the groove, whereby the deflection plate units 211 are securely clamped by the holders 218*a* and 218*b*.

When the web portions 211*a* are inserted into the grooves, the deflection plate units 211 are arrayed by a jig (not shown) in correctly spaced apart relationship. As a result, they can be assembled with a higher degree of pitch accuracy as in the case of the fourth embodiment. In addition, the dimensional accuracy can be maintained in a stabilized manner.

In summary, according to the fifth embodiment, a plurality of deflection plate units can be arrayed with a higher degree of pitch accuracy and the dimensional accuracy can be stabilized against the changes of environmental conditions. As a result, the deflection angle of every drop can be well stabilized so that high quality images can be reproduced.

Figure 12:
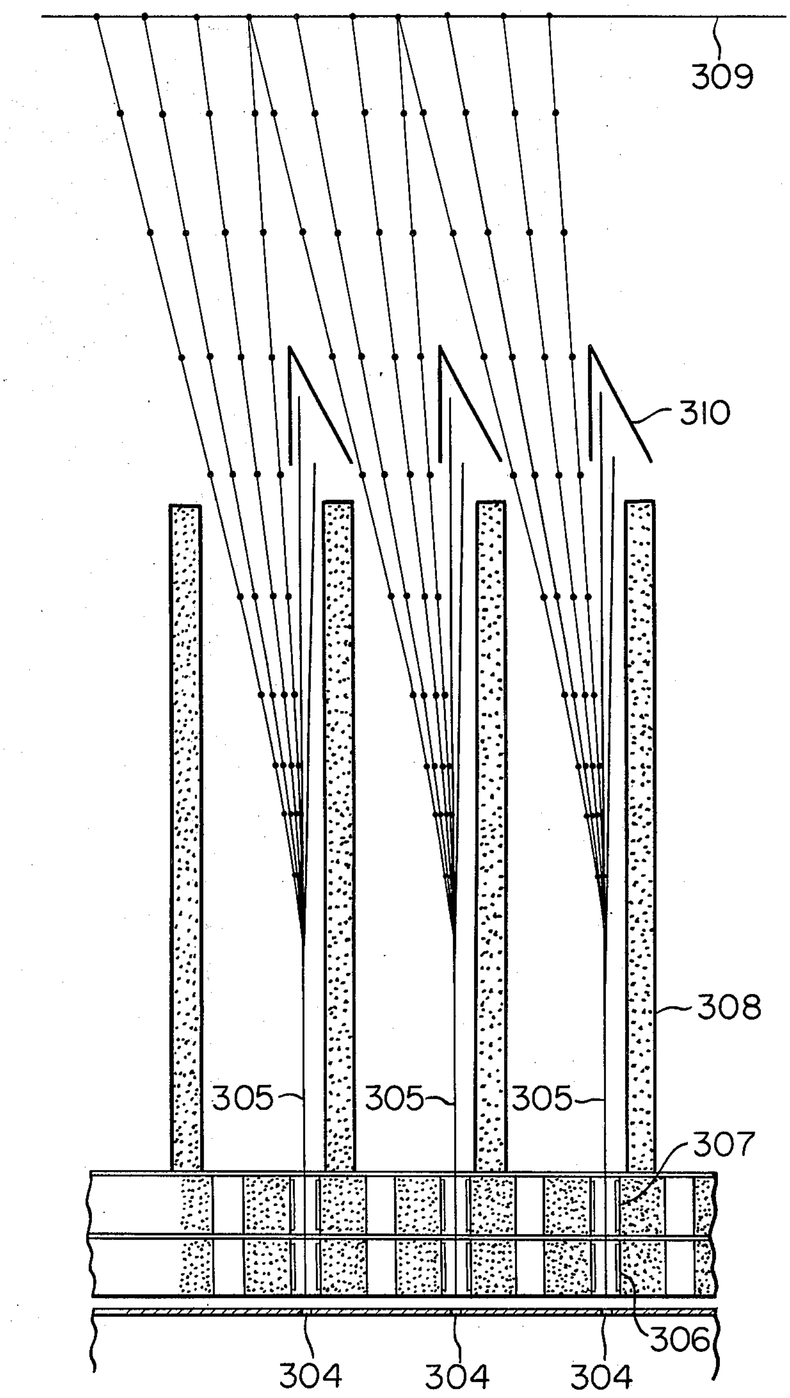
FIG. 12 is a partial top view in section of the charge deflection unit II shown in FIG. 2.
Figure 13:
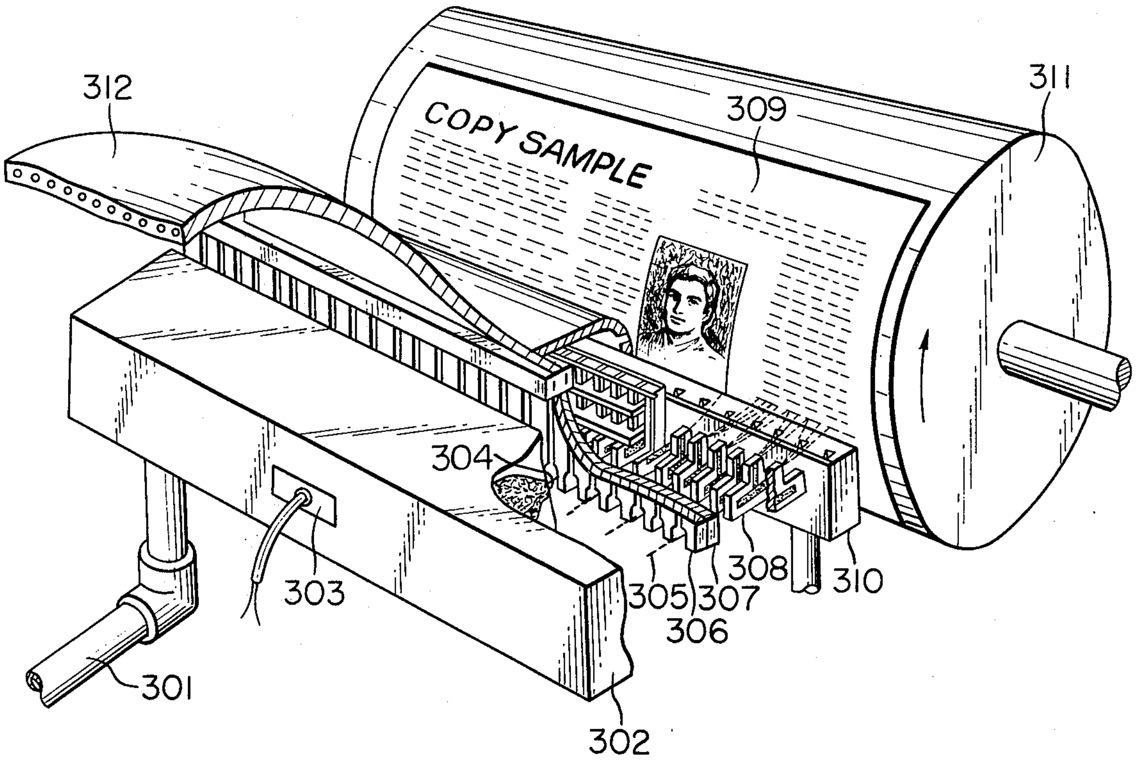
FIG. 13 is a perspective view of a printer incorporating the multiple deflection plate device in accordance with the present invention.

Referring to FIGS. 12 and 13, the ink is supplied through an ink inlet 301 and stored in a drop generator 302. In response to the pulses generated by a piezoelectric element 303, a stream of ink drops 305 issues through each orifice 304 of an orifice plate. A selected ink drop is charged by a charge electrode 306 and the charge on the ink drop is sensed by a charge sensor or detector 307. When the charged ink drop is passing between a pair of deflection plates 308, it is horizontally deflected through an angle which is dependent upon the charge on the ink drop and the deflected ink drop lands on a print surface 309. The ink drops which have not been charged are not deflected and trapped by gutters or ink catchers 310 for recirculation. As shown in FIG. 13, the printer includes a paper feed drum 311 and a lead cable 312 extended from the charge electrodes 306 and the charge detectors 307.

What is claimed is:

1. A multiple deflection plate device for a liquid jet printer, comprising:

a plurality of deflection plate units, each of said deflection plate units consisting of an insulating substrate and having a thin-film pattern of a deflection plate and its connecting line formed on each of the major surfaces of said substrate;

a deflection plate unit holder made of an insulating material and formed with a plurality of parallel and equally-spaced apart slits into which are inserted said plurality of deflection plate units; and one or more dummy lands formed over the surfaces of each deflection plate unit simultaneously with the formation of said thin-film pattern, said dummy lands being spaced apart from said connecting lines by a predetermined distance and so located that when said deflection plate unit is inserted into the corresponding slit of the deflection plate unit holder, a dummy land extends through each said slit, such that no play exists between said deflection plate unit and said slit.

2. A multiple deflection plate device for a liquid jet printer, comprising:

a plurality of deflection plate units, each of said units comprising an insulating substrate having a conductive thin-film pattern on each major surface of said substrate, said pattern comprising a deflection plate portion and an elongated connecting lead portion extending from said deflecting plate portion; and a deflection plate unit holder comprising an insulating material and having a plurality of parallel slits for receiving said deflection plate units in such a manner that only the part of each substrate which contains said connecting lead portion is engaged with a corresponding slit.

3. The device according to claim 2, wherein each deflection plate unit is generally T-shaped, with a base part and a leg part, said deflection plate portion being disposed on said base part and said connecting lead portion being disposed on said leg part.

4. The device according to claim 3, wherein said leg part of each deflection plate unit is engaged on opposite edges by two deflection plate unit holders.

5. The device according to claim 2, wherein the width of each slit is greater than the thickness of the part of the substrate engaged therewith, with a filler material disposed in the space between the slit and substrate.

6. The device according to claim 2, wherein said plurality of deflection plate units are clamped by two juxtaposed comb-shaped deflection plate unit holders, with the engaged parts of the deflection plate units having parallel edges inserted into parallel, equally-spaced vertical slits formed in the opposing side faces of said two comb-shaped deflection plate unit holders.

7. The device according to claim 2, 3, 4, 5 or 6, further comprising means separate from said slits for applying deflection voltages to said connecting lead portions.

* * * * *

UNITED STATES PATENT AND TRADEMARK OFFICE

CERTIFICATE OF CORRECTION

PATENT NO. : 4,338,612

DATED : July 6, 1982

INVENTOR(S) : H. Nagayama

It is certified that error appears in the above-identified patent and that said Letters Patent is hereby corrected as shown below:

Column 3, line 39: "a liquid or ink supply tube; and 6, liquid 7" should read --a liquid or ink supply tube 6; and liquid 7--

Signed and Sealed this

*Sixth* Day of *September 1983*

[SEAL]

*Attest:*

GERALD J. MOSSINGHOFF

*Attesting Officer* *Commissioner of Patents and Trademarks*